United States Patent [19]

Takahashi et al.

[11] Patent Number: 5,045,299

[45] Date of Patent: Sep. 3, 1991

[54] MANUFACTURING METHOD OF CARBON FIBER REINFORCED COMPOUND MATERIALS

[75] Inventors: Susumu Takahashi; Hitoshi Yoshinaga, both of Yokohama; Mochimasa Zusho, Urawashi, all of Japan

[73] Assignee: Kanto Yakin Kogyo K.K., Japan

[21] Appl. No.: 367,148

[22] Filed: Jun. 16, 1989

[30] Foreign Application Priority Data

Jun. 29, 1988 [JP] Japan .................. 63-161889

[51] Int. Cl.$^5$ .............................................. D01F 9/12
[52] U.S. Cl. ............................. 423/447.4; 423/447.1; 264/29.2
[58] Field of Search ............ 423/447.1, 447.4; 264/29.2, 103, 105

[56] References Cited

U.S. PATENT DOCUMENTS

| | | | |
|---|---|---|---|
| 274,291 | 3/1883 | Edison | 423/447.1 |
| 4,237,108 | 12/1980 | Fukuhara et al. | 423/447.1 |
| 4,401,588 | 8/1983 | Turner | 423/447.1 |
| 4,425,407 | 1/1984 | Galasso et al. | 423/345 |
| 4,576,810 | 3/1986 | Redick | 423/447.1 |
| 4,850,186 | 7/1989 | Hiramatsu et al. | 423/447.2 |
| 4,861,575 | 8/1989 | Levan | 423/447.1 |

FOREIGN PATENT DOCUMENTS 2488244  2/1982  France ........................ 423/447.4

*Primary Examiner*—Gary P. Straub
*Assistant Examiner*—Stuart L. Hendrickson
*Attorney, Agent, or Firm*—Shlesinger, Fitzsimmons & Shlesinger

[57] ABSTRACT

In place of mechanical complicated pressure means which apply a pressure upon binder impregnated carbon fibers when they are heated to be a compounded compact of a desired shape, thermo-resistant fibers having a negative coefficient of linear expansion and wound up directly or indirectly over the carbon fibers, are employed so that they tightly fasten the carbon fibers under a pressure on account of their contraction by heat, whereby the shaping and heating of the carbon fibers can readily be achieved and controlled.

5 Claims, 1 Drawing Sheet

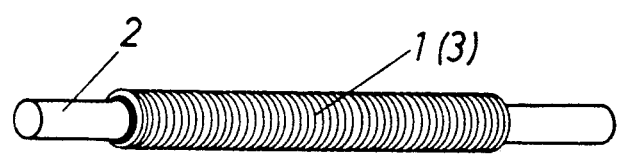
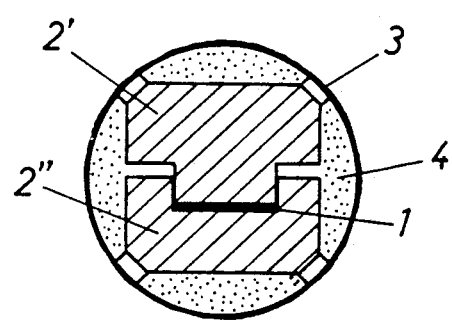

MANUFACTURING METHOD OF CARBON FIBER REINFORCED COMPOUND MATERIALS

BACKGROUND OF THE INVENTION

This invention relates to a method of manufacturing carbon fiber reinforced compound materials. More particularly, it relates to a heating step under a pressure in such method for having binders which have been impregnated to carbon fibers, infusible and also for having them carbonized.

Such method conventionally comprises a step for having a great number of carbon fibers applied with or impregnated by binders such as thermosetting resins including phenol, or furan resins and the like, and thermoplastic resins including pitch and the like, a step for shaping them, and a heating step for having the binders carbonized and consequently infusible under a pressure within a mold or gas atmosphere.

In such method, particularly in its heating step which is carried out under a pressure within a mold or gas atmosphere, a heating furnace employed for said heating step requires specific structures for exerting the pressure. Especially, in the heating step in which the pressure is exerted through the mold, it is extremely difficult though not impossible to exert such pressure onto a carbon fiber compound, if the compound is subjected to said heating step by having it moved continuously through a continuous heating furnace.

BRIEF SUMMARY OF THE INVENTION

This invention is, therefore, to solve difficulties accompanied with the exertion of pressure upon carbon fibers shaped with binders, when they are subjected to a heat treatment.

In the method made in accordance with this invention, carbon fibers preliminarily shaped with binders such as resins and pitch are bound under pressure by having them directly or indirectly wound up at tension by such carbon fibers which have a high modulus of tensile elasticity (for example, of more than 350 Gpa) and a slightly negative coefficient of linear expansion (such as, for example $-1.2 \times 10^{-6}/°$ C.), when they are subjected to a heat treatment, whereby the heat treatment of the aforementioned kind of carbon fibers can effectively be made continuously in a continuous heating furnace even without providing to the furnace complicated structures and means for applying pressure to the fibers.

Aramid fibers having about 3.0 Gpa of breaking strength and about 2% of thermal shrinkage at 400° C., can exert also pressuring effects as mentioned above, when they are wound up over carbon fibers impregnated with binders. It is advantageous that aramid fibers (aromatic polyamide synthetic fibers such as known by Dupont's KEVLAR ARAMID fibers) can readily be removed from resultant carbon fiber reinforced compound materials when it is desired to do so, since said aramid fibers are decomposed when they are heated to 600° C. in the air.

BRIEF DESCRIPTION OF THE DRAWING

FIG. 1 is an explanatory perspective view of fibers wound up over carbon fibers in accordance with this invention, and FIG. 2 is an explanatory sectional view of carbon fibers placed in dies and fibers wound up over the dies for fastening them in accordance with this invention.

EMBODIMENT

The method of this invention is explained further in detail in the following examples and with reference to the accompanying drawings.

EXAMPLE 1

In the example illustrated in FIG. 1, a first elongate bundle 1 of carbon fibers is wound over a metal bar die 2 of 10 mm in diameter. This first carbon fiber bundle, which was made up of 12,000 filaments each of 7-8 μm in diameter and of 3.0-3.5 Gpa of tensile strength, was wound up in 2 mm thickness and 300 mm length or width along bar 2. The carbon fiber bundle 1 thus wound up, was impregnated with a phenol resin solution containing 20 weight % of phenol resin, 10% of graphite, and 70% of methanol. The bundle was then dried at 80° C. And, then, over the bundle 1, a second bundle 3 of carbon fibers of 6-7 μm in diameter, of 350-450 Gpa of modulus of tensile elasticity, and of $-1.2 \times 10^{-6}/°$ C. of linear expansion coefficient, was wound up around the outside of the first bundle 1 while being stretched very tightly. Thereafter the carbon fiber bundle 1, impregnated with the binder, and thus circumferentially tightened by the fibers of bundle 3, was shaped for 60 minutes at 250° C., after which the die 2 was removed. Then, the composite bundle thus shaped was heated to 600° C. at a temperature elevation of 20° C./Hr, and succeedingly to 1,200° C. at a temperature elevation of 40° C./Hr, and kept at 1,200° C. for 30 minutes to produce a tubular member.

The carbon fiber reinforced compound tubular member thus obtained had a tensile strength of 20-40 Kg/mm² in its circumferential direction, and 10-30 Kg/mm² in axial direction. In order to compare these tensile strengths afforded to the above tubular member made in accordance with this invention, a carbon fiber bundle of a composition and dimensions exactly same to the above-mentioned bundle 1, was impregnated with the same binder and dried at 80° C. This comparative bundle was shaped in a conventional manner by placing it for 60 minutes at 250° C. in a two-split mold kept under a pressure of 100 Kg/cm² by conventional means. The bundle was removed from the mold, and then heated at the same temperatures and conditions mentioned above. It had tensile strengths substantially same to those the present invention tubular member had. This means that even though to perform applicant's novel method there were not required any mold and a pressure to be worked upon the mold, the method of this invention nevertheless could produce resultant compound materials having a tensile strength comparable to those produced by conventional methods with expensive machinery and controls. It was found also that the resultant tubular member had a better circumferential symmetrical appearance than the one obtained by conventional methods.

EXAMPLE 2

In this Example illustrated in FIG. 2, a bundle of carbon fibers of 7-8 μm in diameter and of 3.0-3.5 Gpa of tensile strength, were mounted in a cavity (of 100 mm length, 100 mm width, and 10 mm depth) of a female die 2" so that they intersected to each other at right angles and formed to a sheet. This carbon fiber sheet was impregnated with a phenol resin solution consisting of 20 weight % of phenol resin, 10% of graphite, and 70% of methanol, and covered by a male die 2'. A carbon fiber bundle of 6,000 filaments of 6-7 μm in diameter and of 230-240 Gpa of modulus of tensile elasticity was wound up in about 0.3 mm thickness over the dies 2' and 2" via jigs 4, the outer surfaces of which are crescent shaped at crosssections, while being stretched very tightly. The dies accommodating the carbon fiber sheet 1 therein and surrounded by the carbon fiber bundle 3, were heated to 250° C. and kept at this temperature for 30 minutes.

The carbon fiber sheet was then removed from the dies, and heated to 600° C. at a temperature elevation of 20° C./Hr, and succeedingly to 1,200° C. at a temperature elevation of 40° C./Hr, and kept at 1,200° C. for 30 minutes.

The carbon fiber reinforced compound sheet member thus obtained had a tensile strength of 15-20 Kg/mm$^2$.

For the sake of comparison, the pressing of the dies 2', 2" was made at 50 Kg/cm$^2$ by a press machine installed outside of a heating furnace, and they were subjected to heat treatments exactly same to the aforementioned heating. The resultant sheet had a tensile strength of about 20 Kg/mm$^2$, which value is nearly same to the one the present invention carbon fiber sheet member had.

As explained above, since the method of this invention does not require any specific outside pressing apparatus, it is extremely easy to keep a heating atmosphere within a furnace as desired. And, consequently, structures of heating furnaces for the manufacture of carbon fiber reinforced compound materials can be simplified in this invention method.

As readily noticed from the above Examples, carbon fibers can be subjected to any desired high temperature under a pressure, and can be treated continuously by a continuous heating furnace, because the surrounding carbon bundle 3, which provides the necessary pressure or fastening means located on and may travel through a furnace with the carbon fibers that are to be formed into a product in accordance with this invention method. In addition, it shall be noted not only that carbon fiber reinforced compound materials manufactured in accordance with this invention have a tensile strength comparable to the one made by conventional methods with complicated pressing or fastening means, but also that outer dimensions of the formers are more accurate and uniform than the latters'.

We claim:

1. In a method of manufacturing carbon fiber reinforced compound materials in which a number of carbon fibers applied or impregnated with binder resins are subjected to a carbonization treatment under a pressure to produce a product having a compounded configuration, the steps comprising forming a first bundle of binder impregnated fibers into the shape of the product, substantially continuously over-wrapping under tension said first bundle with a second bundle of thermal resistant fibers which have a high tensile strength and a negative coefficient of linear expansion, and heating said bundles of fibers whereby the fibers of said second bundle are caused to shrink and to apply sole uniform pressure to said first bundle of fibers.

2. The method as claimed in claim 1, in which the thermal resistant fibers are carbon fibers.

3. The method as claimed in claim 1, in which the thermal resistant fibers are aramid fibers.

4. The method as claimed in claim 1, wherein said first bundle of fibers is wrapped around a substrate, and said second bundle of fibers is wrapped around and in direct engagement with the outside of said first bundle of fibers.

5. In a method of manufacturing carbon fiber reinforced compound materials in which a number of carbon fibers applied or impregnated with binder are subjected to a carbonization treatment under a pressure to produce a product having a compounded configuration, the steps comprising forming a first bundle of binder impregnated fibers into the shape of the product, positioning said first bundle of fibers in a two-split mold, substantially continuously over-wrapping under tension around the outside of said mold a second bundle of thermal resistant fibers which have a high tensile strength and a negative coefficient of linear expansion, and heating said bundles of fibers whereby the fibers of said second bundle are caused to shrink and to apply pressure through said mold to said first bundle of fibers.

* * * * *